J. E. SHEUMAN.
CUTTER HEAD.
APPLICATION FILED APR. 27, 1920.
1,368,459.
Patented Feb. 15, 1921.
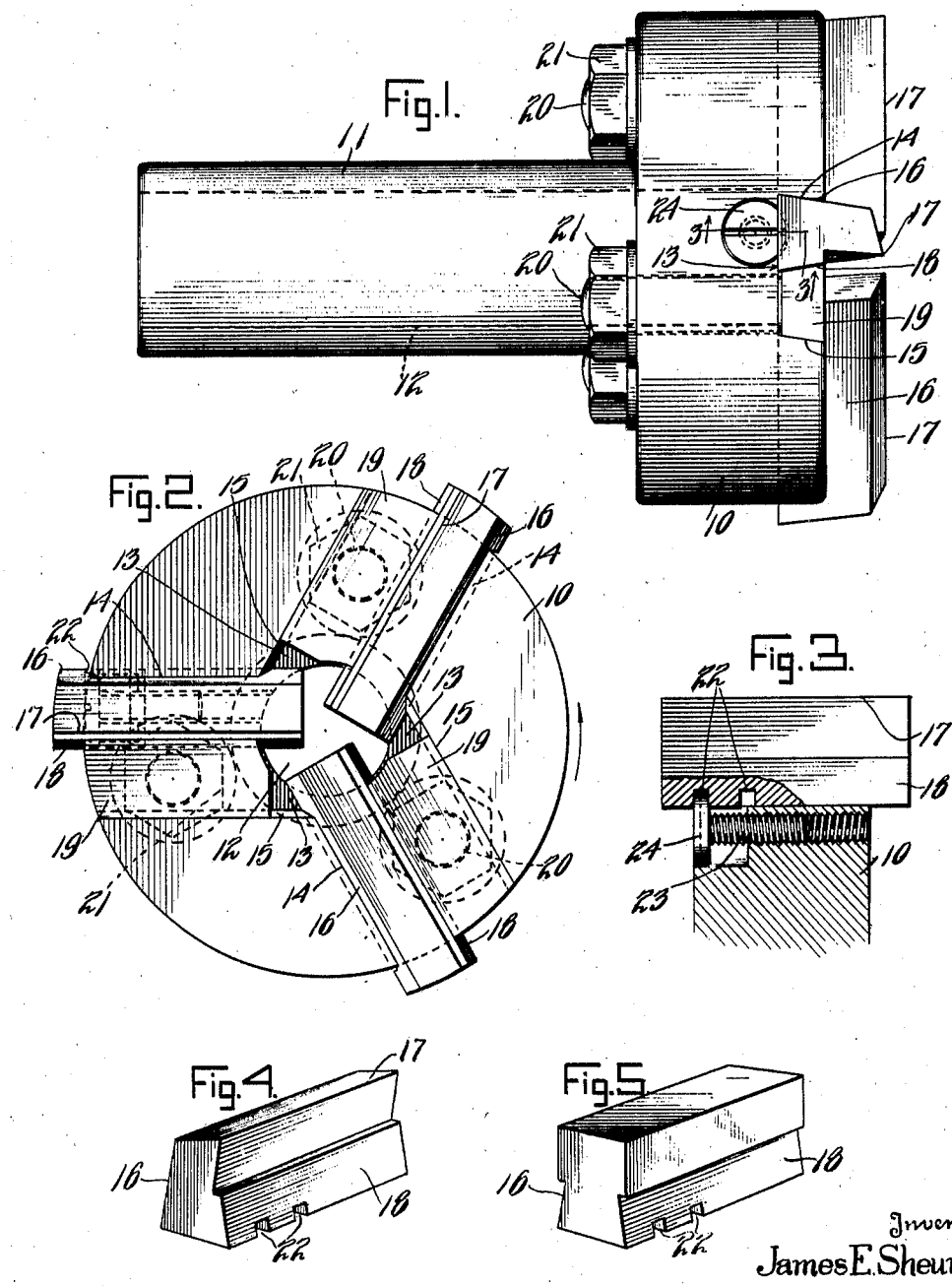
Inventor
James E. Sheuman.
By Bradford Morrill Bierman
Attorneys

UNITED STATES PATENT OFFICE.

JAMES EDWIN SHEUMAN, OF WAYNESBORO, PENNSYLVANIA.

CUTTER-HEAD.

1,368,459.   Specification of Letters Patent.   Patented Feb. 15, 1921.

Application filed April 27, 1920. Serial No. 377,018.

*To all whom it may concern:*

Be it known that I, JAMES E. SHEUMAN, a citizen of the United States, residing at Waynesboro, in the county of Franklin and State of Pennsylvania, have invented certain new and useful Improvements in Cutter-Heads, of which the following is a specification.

This invention relates to cutter heads and has for an object to provide a head with improved means for adjusting and locking the cutters.

Further object of the invention is to provide a cutter head having approximately radial cutters adapted to operate upon work externally or internally, hereby used in one manner, and machine either an exterior cylindrical surface or in another relation an interior cylindrical surface.
With these and other objects in view the device comprises certain novel constructions, units, parts and combinations as will be hereinafter more fully described and claimed.

In the drawings:
Figure 1 is a view of the device in side elevation showing a form of tang adapting the device for use with one type of machine.

Fig. 2 is a view of the device in end elevation.
Fig. 3 is a sectional detail view taken on line 3—3 of Fig. 1.

Fig. 4 is a perspective view of one of the cutters.

Fig. 5 is a perspective view of a rest block employed to take the place of a cutter under some conditions.

The improved cutter head which forms the subject matter of this application is adaptable for a considerable variety of uses and in conjunction with a considerable number of machines. It may be employed for instance as a hollow mill tool, a boring head or a box tool and may be employed for instance in a turret lathe, a screw machine or a drill press. It is to be understood that the utility and the machines with which it may be employed are not limited by the foregoing statement and drawing but that the statement and drawing are only by way of illustration.

The cutter comprises a head member 10 which for use with some machines may have a shank 11 concentrically tubular to communicate with the central work opening indicated at 12. The exterior contour of the shank 11 as shown at Fig. 1 is only illustrative and any form of shank will be constructed of any usual or ordinary or required contour to fit and operate in conjunction with any requisite machine or the shank omitted as the machine makes desirable. The head 10 is provided with a plurality of radially disposed grooves having their opposite walls similarly inclined even to parallelism although such parallelism is not essential. These radial grooves indicated at 13 with their similarly inclined walls 14 and 15 are shown particularly at Figs. 1 and 2. One of the walls as 14 will, by reason of the inclination to the axis, be undercut and complementary to the inclined side 16 of the cutters 17. The cutters may be of any approved or required type and configuration. The opposite side of the cutter, shown at 18 is inclined reversely to inclination of the walls 14 and 15. The angle of inclination of the side 18 is not essential but it is desirable that the angle be substantially the same as the angle of inclination of such walls.

Between the wall 15 and the inclined side 18 of the cutter 17 a lock block 19 is employed having its opposite side edges inclined complementarily to the wall 15 and side 18 and slightly wider than the interval so that when forced home it does not quite contact with the bottom of the groove as indicated more particularly at Fig. 1. The block 19 is provided with a bolt 20, preferably, though not necessarily integral therewith, and a nut 21 is applied upon the surface of the head opposite the cutting face for the purpose of drawing the block into locking engagement.

For the purpose of longitudinally moving and adjusting the cutters 17, after the block 19 has been loosened, the cutters are provided with one or more transverse furrows 22. A screw 23 is inserted approximately radially into the head 10 in axial parallelism with the major axis of and beneath the cutters 17 and provided with a disk-like head 24 the periphery of which engages in either one of the transverse furrows 22 as the conditions of adjustment may make necessary or desirable.

With the parts associated as at Figs. 1 and 2 the head will cut a cylindrical body having its axis at the center of rotation, and its peripheral surface at the inner ends of the cutters.

When, however, a larger or smaller cylinder is to be machined the blocks 19 are loosened, by manipulating the nuts 21, and the cutters are then moved radially the required distance, to provide the required cut, by the manipulation of the screws 23. Adjustment having been obtained, is maintained by tightening the nuts 21 and thereby forcing the blocks 19 into locking engagement with the cutters.

The rest block shown at Fig. 5 has walls 16 and 18 corresponding to like walls of the cutter shown at Fig. 4. The rest block, however, is not a cutter but is employed when one or more of the cutters are omitted and bears against the surface machined by the cutter or cutters remaining, properly centering the work and preventing vibration.

The device is also employed as a boring head or internal cutter by adjusting the outer ends of the cutters 17 to the proper diameter instead of adjustment relative to the inner ends. With the cutters adjusted to cut the required circle at their outer ends the device becomes a boring tool to be used in substantially the usual and ordinary manner.

In either the internal or the external cutting the shape of the cutter is such as to bear against the finished or machined work to properly center the tool and prevent vibration. When employed in cutting an exterior surface the inner ends of the cutters, being substantially perpendicular to the cutting edge will bear against the machined surface, while the same is true of the outer ends this being accomplished by the formation of the cutting edge and its relation to the longitudinal axis of the cutter itself.

Having thus fully described my said invention what I claim as new and desire to secure by Letters Patent is;

1. A cutter head comprising, a hollow head member having substantially radial slots with similarly inclined side walls, forming undercuts therein, cutters engaging one of the side walls and having reversely inclined sides, one in complementary engagement with the under-cut side of the slot, a locking block having reversely inclined sides complementary to the free side of the cutter and the proximate side of the slot, means to tighten the block into locking engagement and means to move the cutter radially independently of the block to advance the cutting edges of the cutters into operative position, extending within the hollow portion of the head member or outwardly from the periphery of the head member.

2. A cutter head comprising, a hollow head member having radial slots therein extending from the periphery to the hollow portion of the head, cutters seated in the slots, means to lock the cutters against movement and manually actuated screws positioned in parallelism with the cutters having heads in engagement with transverse slots formed in the cutters to move the cutters into operative position extending within the hollow portion of the head or outwardly from the periphery.

3. A cutter head comprising, a hollow head member having radial slots with similarly and equally inclined walls, a cutter in engagement with one of the inclined walls leaving an interval between the cutter and the opposite inclined wall, said cutter being provided with a transverse slot formed in its under side, a screw mounted in substantial parallelism with the cutter having a head in rotative engagement with the transverse slot adapted to move the cutting surface of the cutter into operative position extending within the hollow portion of the head or outwardly from the periphery, a block having reversely inclined sides seated in the interval between the cutter and the opposed side of the slot and means to exert clamping tension upon the block.

In witness whereof, I have hereunto set my hand and seal at Waynesboro, Pennsylvania, this 24th day of April, A. D. nineteen hundred and twenty.

JAMES EDWIN SHEUMAN. [L. S.]

Witnesses:
W. S. FOUST,
A. STEWART ETTER.